United States Patent [19]

Baudou et al.

[11] Patent Number: 5,752,276
[45] Date of Patent: May 19, 1998

[54] PROTECTIVE HELMET EQUIPPED WITH OPTRONIC SYSTEMS AND ADJUSTMENT METHOD

[75] Inventors: Joël Baudou, Medard En Jalles; Benoît Darbo, Cauderan; Patrick Lacroux, Bordeaux Cauderan; Vincent Vitte, Bordeaux, all of France

[73] Assignee: Sextant Avionique, Meudon la Foret, France

[21] Appl. No.: 454,175

[22] PCT Filed: Dec. 21, 1993

[86] PCT No.: PCT/FR93/01280

§ 371 Date: Aug. 11, 1995

§ 102(e) Date: Aug. 11, 1995

[87] PCT Pub. No.: WO94/14349

PCT Pub. Date: Jul. 7, 1994

[30] Foreign Application Priority Data

Dec. 22, 1992 [FR] France ................... 92 15480
Jun. 29, 1993 [FR] France ................... 93 07894

[51] Int. Cl.$^6$ ................ A42B 3/18; G02B 27/00
[52] U.S. Cl. ............... 2/6.3; 2/422; 2/424; 359/632
[58] Field of Search ................... 2/6.2, 6.3, 6.4,
2/6.5, 6.7, 6.1, 410, 422, 424; 359/630,
632, 407, 409, 815

[56] References Cited

U.S. PATENT DOCUMENTS

| | | | |
|---|---|---|---|
| 4,156,292 | 5/1979 | Helm et al. | 2/6.2 |
| 4,991,818 | 2/1991 | Darbo et al. | 248/681 |
| 5,000,544 | 3/1991 | Staveley | 359/630 |
| 5,184,231 | 2/1993 | Ellis | 2/6.2 |
| 5,266,930 | 11/1993 | Ichikawa et al. | 359/632 |
| 5,459,612 | 10/1995 | Ingleton | 359/630 |
| 5,543,968 | 8/1996 | Freeman et al. | 359/632 |

FOREIGN PATENT DOCUMENTS

| | | | |
|---|---|---|---|
| 284389 | 9/1988 | European Pat. Off. . | |
| 290293 | 11/1988 | European Pat. Off. . | |
| 395570 | 10/1990 | European Pat. Off. . | |
| 408344 | 1/1991 | European Pat. Off. | 2/6.3 |
| 475679 | 3/1992 | European Pat. Off. . | |
| 2309944 | 11/1976 | France | 2/6.2 |
| 2672777 | 8/1992 | France | 2/6.4 |
| 2672778 | 8/1992 | France | 2/6.2 |
| 2062285 | 5/1981 | United Kingdom . | |
| 2247822 | 3/1992 | United Kingdom | 2/6.2 |

*Primary Examiner*—Michael A. Neas
*Attorney, Agent, or Firm*—Oblon, Spivak, McClelland, Maier & Neustadt, P.C.

[57] ABSTRACT

A protective helmet including a shell equipped with an optronic unit allowing visualization of an image by a wearer of the helmet. Adjustment of a position of the optronic unit with respect to the sight of the wearer is simplified by prior adjustment of an interpupillary distance of the optronic unit.

20 Claims, 9 Drawing Sheets

SECTION A-A

PROTECTIVE HELMET EQUIPPED WITH OPTRONIC SYSTEMS AND ADJUSTMENT METHOD

BACKGROUND OF THE INVENTION

1. Field of the Invention

The invention relates to the field of optoelectronic assemblies intended to be mounted on a helmet.

It relates to a helmet equipped with optronic display means and a method for adjusting the position of an image generated by the optronic means.

Optoelectronic assemblies comprise:

a means for generating an image image processing and return means a means for returning the image to the eye of the wearer of the helmet.

The generating means may, for example, be a cathode-ray tube, a liquid-crystal screen, an image conveyed by optical fiber, one or more light-emitting diodes arranged in a matrix and controllable individually or collectively in order to form an image in pixels or else a projected sighting device.

The processing and return means generally comprise optical elements such as lenses, mirrors, functional holograms.

The means for returning the image to the eye of the observer is often constituted by the visor of the helmet.

This visor, made of transparent material, thus fulfills the role both of protecting the face of the wearer and of optical return.

Correct operation of the optronic assembly requires its various components to be and remain well-positioned with respect to each other. Furthermore, the visor, which is the final element for return to the eye of the observer, must be well positioned with respect to this eye.

2. Discussion of the Background

In existing devices, the various components of the system are mounted on the shell of the helmet and each shell is individually personalized in order to be matched to the morphology of the wearer.

The operations of adjusting in the personalization phase are fairly time-consuming and onerous, in particular for the wearer of the helmet. Furthermore, current helmet shells have low rigidity and deform under the effect of temperature variations or under the effect of inertial forces in the acceleration phases.

The result of this is that the components of the optoelectronic assembly move relative to each other and the quality of the image is degraded.

SUMMARY OF THE INVENTION

In regard to this state of the art, the invention aims to constitute an optoelectronic assembly for a helmet, all the elements of which, including the visor, are connected together by a rigid mechanical structure.

The presence of such a structure makes it possible to separate the operations of adjusting the optronic system from the operations of matching to the observer, constituting the personalization phase of the helmet.

This separation has the following advantages:

it facilitates the adjustment operations because the optronic system can be adjusted industrially in the factory on a suitable workstation. Adapting to the morphology of the wearer of the helmet amounts to displacing the entire structure or only a part of this structure with respect to the helmet. In the latter case, the structure is equipped with means capable of making it nondeformable again after the adjustments.

This results in a decrease in the manufacturing cost.

if the method of fastening the structure onto the helmet is reversible, separation facilitates the maintenance operations since the optomechanical assembly is returned to the factory on its own. Separation facilitates interchangeability of two assemblies having the same function. It also allows, with constraints on the fastening points, interchangeability for assemblies having different functions. It is thus, for example, easy to replace an optronic assembly for night vision or infrared vision with a helmet visor.

Fastening the optronic elements onto a rigid mechanical structure improves the permanence of the image quality since the various components are fixed with respect to each other.

For all these purposes, the subject of the invention is a protective helmet comprising a shell equipped with a set of optronic means allowing visualization of an image by a wearer of the helmet, characterized in that the means constituting the optronic assembly are assembled on an autonomous rigid mechanical structure itself fixed to the shell of the helmet.

In a particular embodiment, the structure is self-supporting. This means that substructures in tube form containing the optronic elements are themselves rigid and their mechanical assembly constitutes a rigid structure. This embodiment is particularly suited to binocular optronic assemblies because it is then possible to build the structure in two branches, right and left, which balance.

In another embodiment, the autonomous mechanical structure consists of at least two substructures which can move with respect to each other. In this case, one of the substructures may consist of a shell-shaped plate, the plate being substantially parallel to the shell of the helmet. In this embodiment, it is advantageous for the first substructure to be the mechanical part fixed to the shell of the helmet and for the second substructure carrying the optronic means to be mobile with respect to the first, so as to create a rotational movement of the optical axis of the optronic means.

In this advantageous embodiment, the substructure fixed to the helmet may be a reinforcement of the shell of the helmet, for example a rib.

According to the invention, when referring to a rigid mechanical structure carrying the optronics, this is a mechanical structure by which the optronic image generation and transfer elements are connected and an element for return to the eye of the wearer, it being possible for this element to be a part of the visor of the helmet.

When the invention is produced in the form of a single rigid structure, adaptation to the particular morphology of a pilot is carried out in a first mode by translation of the rigid structure with respect to the shell of the helmet. This autonomous structure, which contributes to stiffening of the shell of the helmet, is displaced with respect to the shell of the helmet by a combination of oblong holes and spacer wedges. The oblong holes allow lateral displacement of bolts intended to fix the rigid structure onto the helmet.

The spacer wedges allow relative vertical displacement.

This solution has the advantage of simple production, whereas the shell of the helmet which must be able to contain the structure, regardless of its lateral displacement, is necessarily wide.

Overdimensioning of the shell of the helmet has two drawbacks.

On the one hand, it contributes to increasing the mass of the helmet and, on the other hand, it may contribute to causing the helmet to depart from a template of previously fixed size. The latter possibility occurs in particular when the helmet is intended to be worn in a cockpit of limited size, such as an aircraft cockpit or a Formula 1 car cockpit.

This is why, in a second embodiment, adaptation to the particular morphology of the wearer, that is to say alignment of the optical axis of the image returned by the return element or combiner with the optical axis of the eye of the wearer, is preferably carried out by means of a rotation of at least a part of the rigid structure, creating a rotation of the optical axis of the optronic means.

The alignment produced according to this second embodiment makes it possible to reduce the volume of the helmet, in particular by reducing its width and thereby decreasing the overall mass of the helmet.

In the case of a monocular system, the use of this second embodiment may make it possible, if the adjustment is given sufficient amplitude, to adapt projection of the synthetic image at will onto the right eye or the left eye, this being without substantially increasing the dimensions and the mass of the shell of the helmet and of the rigid bearing structure of the optronic device. This embodiment is suited to any combiner having at least one axis of revolution, in particular to spherical combiners since, in this case, there is a choice of axis of revolution.

The invention also relates to a method which becomes particularly simple for positioning the optronic image in the adjusted position with respect to the eye of a wearer of the helmet.

It is a method for setting an image generated by a set of optronic means of a helmet display in an adjusted position, the helmet comprising a shell, the image being projected onto a surface of an element reflecting at least a part of the light received, this element having the function, in the adjusted position, of returning the image to the pupil of an eye of an observer, which method is characterized in that:

- the optronic means are assembled on an autonomous rigid structure;
- the rigid structure carrying the optronic means and the shell of the helmet are directly assembled in the adjusted position.

In one embodiment of the method, it is the assembling of the shell with the rigid structure which is adjustable in two degrees of freedom. In another embodiment, the assembly is adjustable in one degree of freedom by an adjustable assembly of the structure and the shell and, in the other degree of freedom by adjusting the rigid structure. For this purpose, the latter may include a plurality of parts which are mobile with respect to a fixed part, adjusting in one degree of freedom being obtained by adjusting the position of the parts which are mobile with respect to the fixed part.

BRIEF DESCRIPTION OF THE DRAWINGS

The embodiments of helmets according to the invention and the adjustment method for individualizing the helmet will now be illustrated with the aid of particular embodiments which are described with reference to the attached drawings, in which.

DESCRIPTION OF THE PREFERRED EMBODIMENTS

Figure 1:
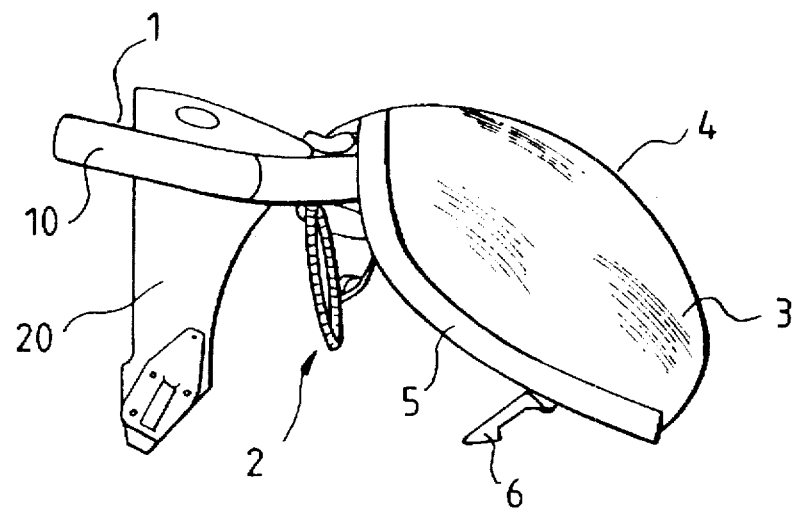
FIGS. 1 and 2 represent a side and perspective view of a monocular optronic assembly, for example a helmet sight on its autonomous mechanical structure.
Figure 2:
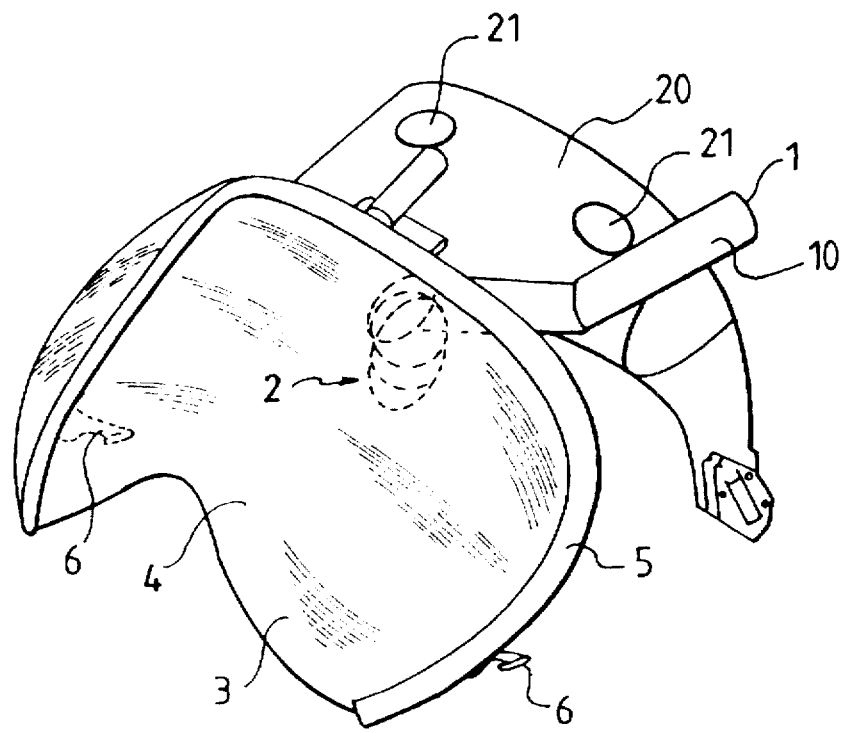

FIGS. 1 and 2 represent, in profile and perspective, a monocular optronic assembly 10 including, in particular, a return mirror 2 and a visor 3. The visor itself is composed of a transparent part 4 and a stiffening frame 5. In the two figures, the visor is in the open position. In this embodiment, the visor 3 can pivot about a horizontal axis. Hooks 6 make it possible to hold it in the closed position. The images are generated and transferred to the return mirror 2 by elements contained by a supporting tube-form substructure 1. The elements constituting the optronic assembly are fixed onto a plate 20. This plate 20 is a shaped and machined panel which substantially has the shape of the front part of the shell of a helmet. It is sufficiently rigid so as not to deform under the action of the inertial forces during accelerations. It includes oblong holes 21 allowing it to be fastened, with adjustment, to the shell of a helmet.

Figure 3:
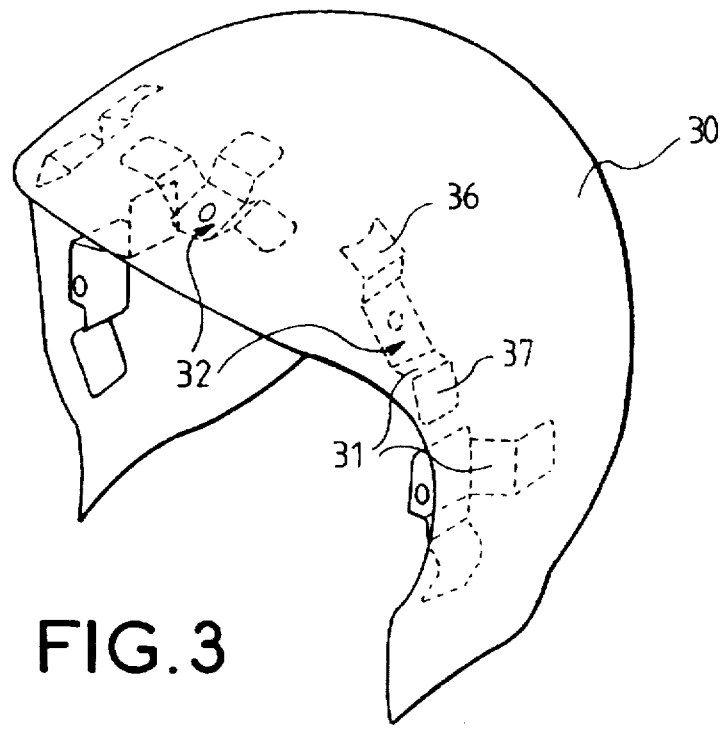
FIG. 3 is a perspective view of a helmet shell intended to receive the bearing structure represented in FIGS. 1 and 2.

The drawing of such a shell is represented in FIG. 3.

This figure represents, in perspective, a helmet shell 30. This shell is equipped with fastening lugs 31.

Figure 4:
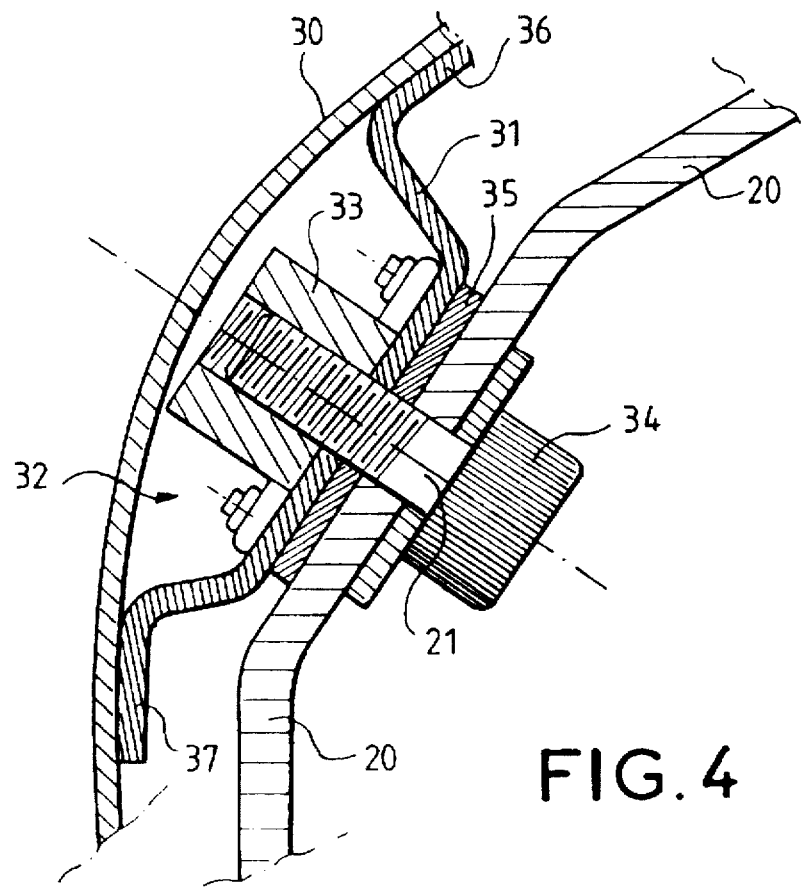
FIG. 4 represents a detail of the fastening of the autonomous mechanical structure onto the helmet shell.

FIG. 4 shows the detail of fastening the plate 20 onto the shell 30. A lug 31 has, in section, substantially a U-shape extended at the two ends of the branches of the U by perpendicular outer parts 36, 37. These perpendicular parts are mechanically attached to the shell of the helmet. The hollow part 32 of the U houses a captive nut 33. A bolt 34 passing through one of the oblong holes 31 in the fastening plate 20 makes it possible to fasten the plate 20 onto the shell 30. The plate 20 can be moved in translation using the oblong holes and spacer washers 35. The washers 35 are preferably elastic so as to damp the vibrations between the shell 30 and the plate 20.

The plate shell assembly constitutes a box structure which, at equal mass, has greater resistance to deformations.

In the assembly represented in FIG. 4, the fastening plate 20 of the optronic assembly 10 is fixed inside the shell 30 of the helmet. It may equally well be fixed outside if considerations of bulk so require. In this case, the shell must sometimes be supplemented by a rigid outer casing 50 (FIG. 6) which is fixed onto the plate or onto the shell of the helmet. This casing has the function of creating an aerodynamic profile. This function is necessary when the wearer of the helmet is capable of actuating an ejectable seat (case of military aircraft). In other cases, helicopter, tank, etc., this additional casing is not indispensable.

Figure 5:
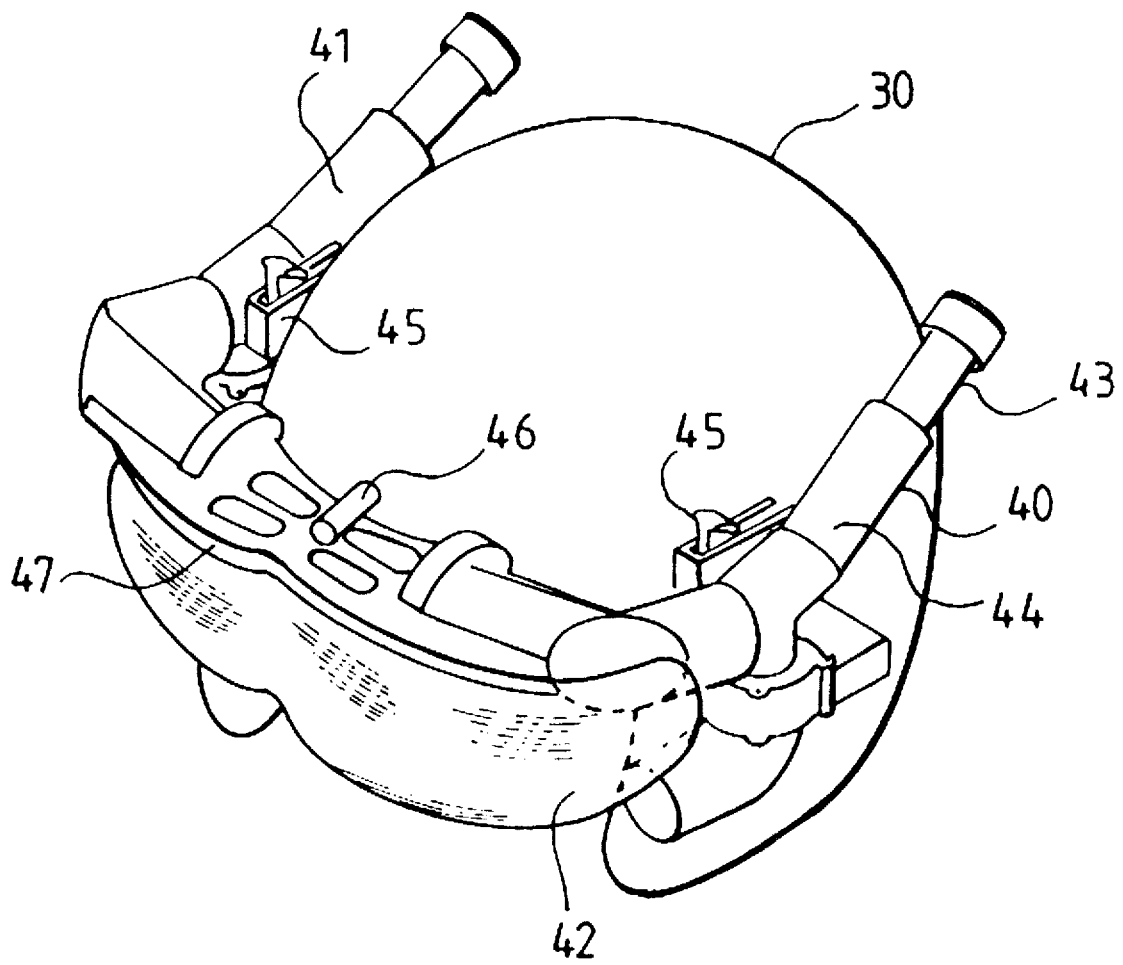
FIG. 5 represents a binocular optronic assembly constituting a self-supporting structure, mounted on a helmet shell.

FIG. 5 represents another exemplary embodiment. In this example, a binocular optronic assembly 40 is housed inside a self-supporting structure 41. The structure is termed self-supporting because the entire device, apart from a visor 42, is housed in a substructure in the form of rigid tubes 43 which constitute a symmetrical assembly. The assembly consists of two branches 44 which are mutually symmetrical with respect to a sagittal vertical plane. The two branches have substantially an L-shape. Two interchangeable clips 45 and a ball-articulated centering stud 46 allow fastening to the helmet. The clips 45 which create lengthwise centering and the ball articulation 46 which creates a lock in rotation and translation allow isostasy. The shell of the helmet includes pins, not shown, on which the clips 45 are fixed, and an attached part, not shown, receiving the ball articulation of the centering stud. Adjustment in translation is ensured by the interchangeability of the elements 46 and 45, the lengths and heights of which are chosen from a range allowing a sufficient adjustment range.

Another method of fastening the bearing structure, which makes detachment and interchangeability more difficult, consists in holding the structure in place by setting its constituents in a polymerizable hard foam. The use, composition and implementation of such foams are known in the art. According to the use envisaged here, tools hold the structure in place throughout the polymerization time of the foam. The structural elements are set in the foam and no longer move.

This procedure has the advantage of producing moulding of the head of the wearer so that the helmet comes into position naturally and remains positioned such that it is fixed with respect to the head of the wearer.

In the embodiments described hereinabove with reference to FIGS. 1 to 5, the rigid plate 20 or the self-supporting structure 40 are positioned to be adjusted in position with respect to the return element 2 by two-axis translation. The embodiments of the invention in which positioning in an adjusted position is obtained at least partially by rotation either of a first element of the rigid structure with respect to a second or by rotation of the entire rigid structure with respect to the shell will now be described with reference to FIGS. 6 to 13. Complementary adjustment may be obtained by a second rotation or a translation.

Figure 6:
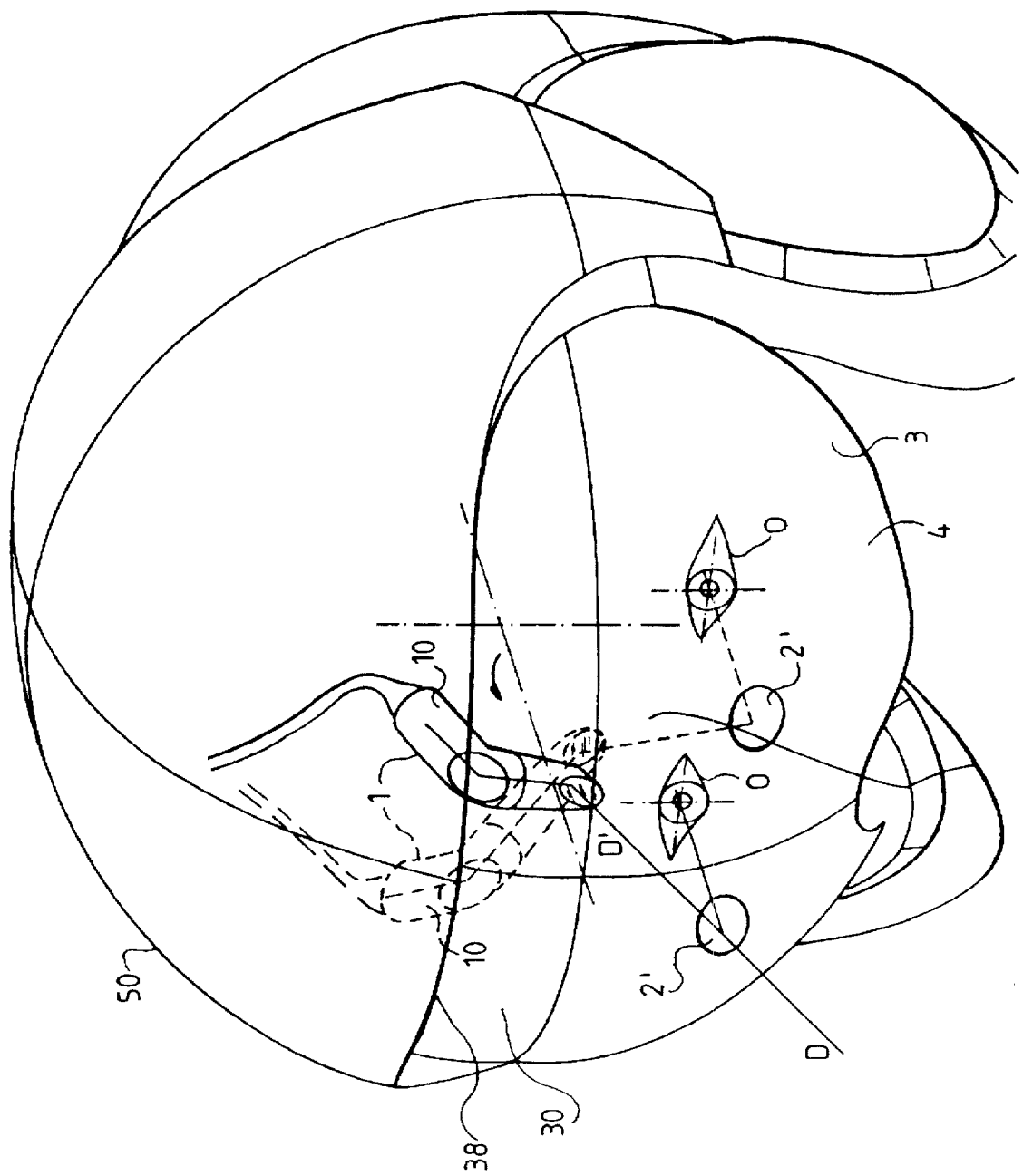
FIG. 6 represents an overall perspective view of a helmet including a rigid structure according to the invention, in which the optronic means can be rotated with respect to the rigid structure.

FIG. 6 represents a perspective view of a helmet including a shell 30 and a visor 3 including a transparent part 4. In the raised position, the visor 3 can be housed in a housing 38 provided between the shell 30 and another shell 50 intended to give an aerodynamic shape which is useful during possible ejection. A bearing substructure 1 containing a monocular optronic assembly 10 has been represented in two positions, one in solid lines and the other in dashes.

The substructure 1 is mechanically connected to a plate 20 which, for reasons of clarity of the figure, has not been represented.

In the position represented in solid lines, the optical axis DD' of the optronic assembly 10 coincides with the optical axis of a semireflective surface 2'. This surface 2' plays the part of the mirror 2 in the exemplary embodiments described with reference to FIGS. 1 to 5. This surface 2' is included in the transparent part 4 of the visor 3. Although this surface forms an integral part of the visor, its existence may in general be observed by the difference in the optical qualities of this surface 2' and of the rest of the visor and, in certain embodiments, by a local variation in the curvature of the visor which is distinguished from the overall curvature variation.

Adjusting the optronics consists in adapting the position of the optronic image generation means 10 with respect to the combiner 2' so as to make the optical axis of the eye 0 of the individual wearer of the helmet coincide with the axis of the image returned by the combiner 2'. In general, the surface area of the combiner 2' is large enough for there to be no difficulties in adapting the optronic means and the combiner. On the other hand, for an individual observer, the position of the eye is determined and characterized by the interpupillary distance (IPD) which is the distance separating the two eyes. Rotating the optronic assembly about an axis of revolution of the combiner 2' in no way changes the optronics/combiner connection, but it does laterally displace the position of the axis of the image returned, so that it is possible to adapt the position of this axis to the value of the interpupillary distance. After lateral adjustment has been completed, the height adjustment will be carried out, for example, using the padding of the shell of the helmet which is adapted by moulding to the head of the individual wearer of the helmet.

In the example represented in FIG. 6, the surfaces 2' are spherical and the center of the spheres is located in the sagittal plane, which corresponds, for the helmet, to its plane of symmetry. The axis of rotation of the optronics lies in to the sagittal plane.

An example of a mechanism making it possible to cause the optronics to turn between two positions, one corresponding to the left eye and the other corresponding to the right eye, of an observer, and, for each of these positions, to make a fine adjustment between the extreme values of interpupillary distances will be explained hereafter with reference to FIGS. 7a to 7c.

Figure 7A:
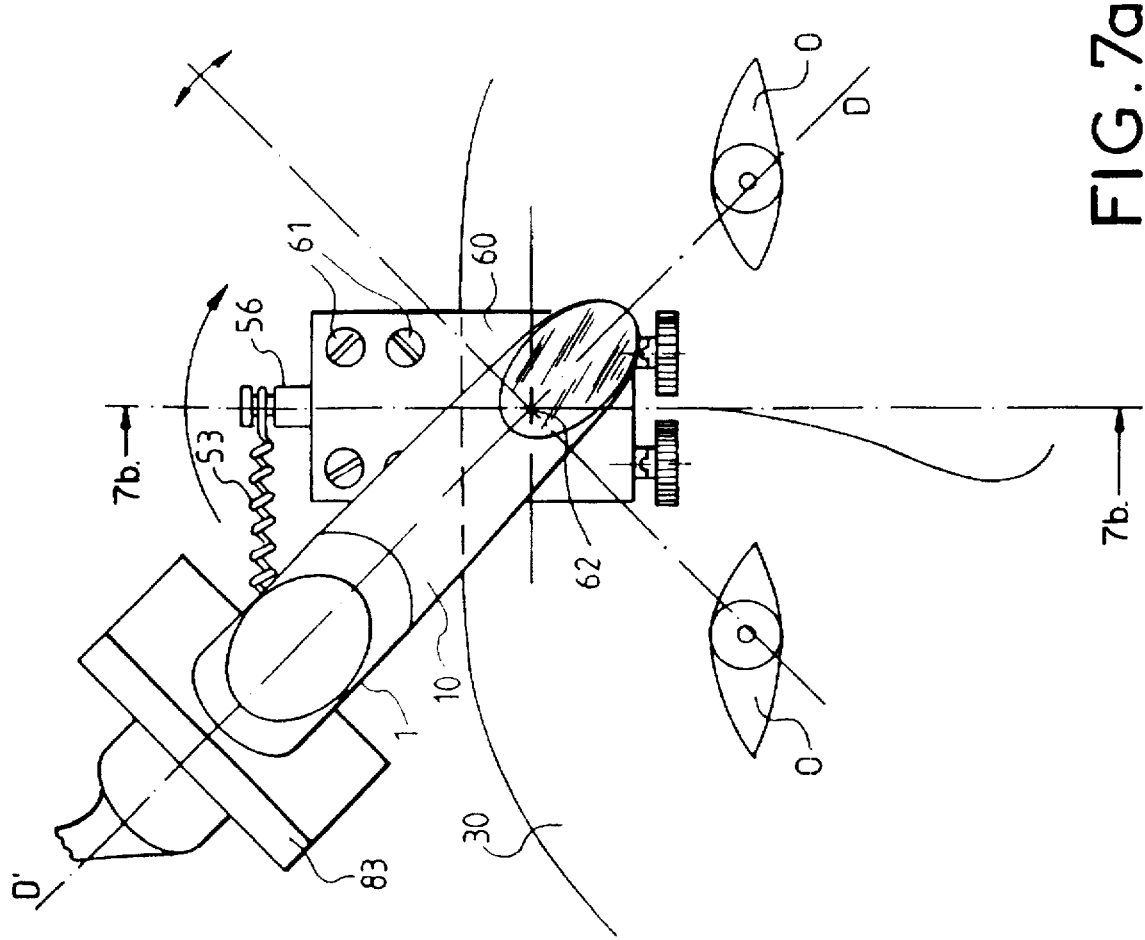
FIGS. 7a to 7c represent the detail of a mechanism fixed to the plate and allowing rotation of the optronic part.

FIG. 7a is a front view of such a mechanism example.

It represents a body 60, fixed by screws 61 to a part of a plate (not shown) rigidly connected to a support of a visor 3 (not shown). The optronic assembly 10 of axis DD' can be moved in rotation about an axis represented in FIG. 7a by a point 62. A return spring 53 is fixed at one of its ends on a stud 56 of the body 60 and, at the other, to a part which is axially separated along DD' from the axis of rotation 62 of the tube 1 containing the optronics.

Figure 7B:
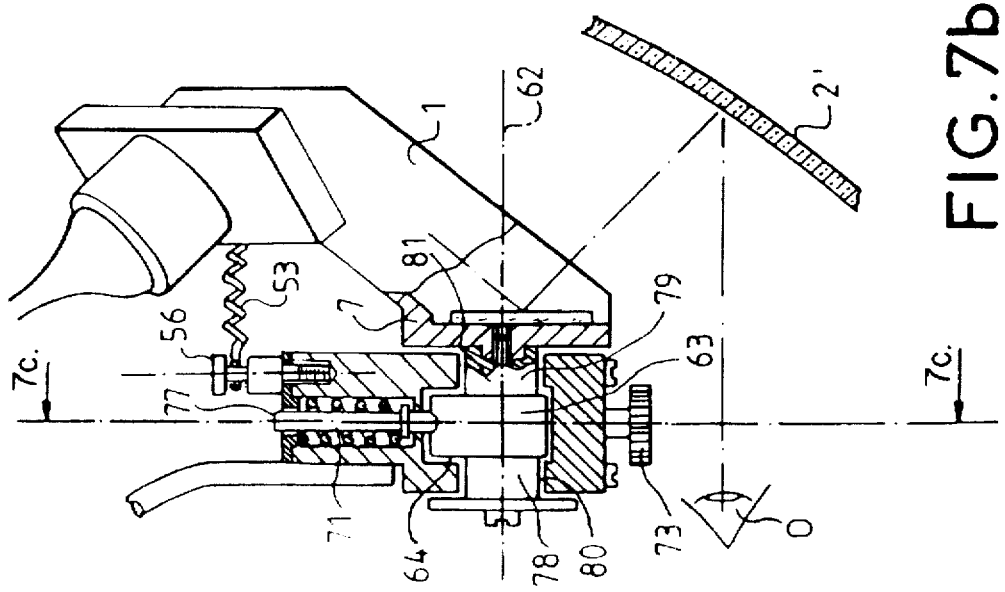
Figure 7C:
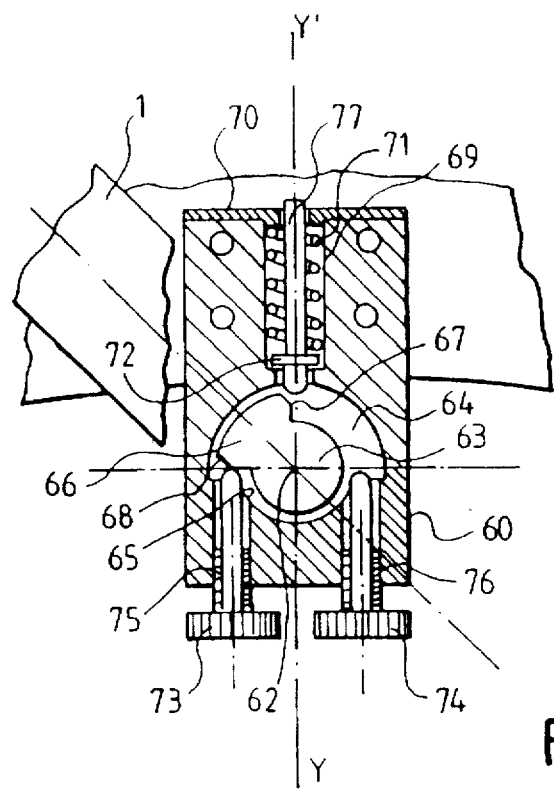

FIGS. 7b and 7c are intended to show the internal mechanism of the body 60. FIG. 7b is a section along the line 7b—7b in FIG. 7a and FIG. 7c is a section along the line 7c—7c, in FIG. 7b. FIG. 7c will be dealt with first. It shows a shaft 63 mechanically connected to the tube 1 containing the optronic assembly 10. The shaft 63 can be moved in rotation in a housing 64 of the case. The shaft has the shape of a circle on which a sector extending beyond the surface of the circle is attached. In FIG. 7c, the shaft 63 has been represented in the position which it occupies in the housing 64 when the tube 1 is on the left. The sector 66 is terminated by two inclined planes 67, 68. In the position represented, the inclined plane 67 is held in position by a push member 77 which can be moved in a hole 69. The hole 69 emerges, on one side, in the housing 64 and, on the other side, outside the body 60. It is closed by a panel 70 including a hole in which the push member 77 can move. A spring 71 housed in the hole 69 around the push member 77 bears, on the one hand, on the panel 70 and, on the other hand, on a shoulder 72 of the push member 77.

Screws 73, 74 are housed in tapped holes 75, 76 in the body 60. These holes emerge, on the one hand, outside the body 60 and, on the other hand, in the housing 64. In the position represented in FIG. 7c, a rounded end of the push member 77 bears on the inclined plane 67 of the projecting section 66, whereas the screw 73 bears on the other inclined plane 68 of the projecting sector 66.

Operation is as follows.

By rotation of the screw 73, it is possible to fine-adjust the angular position of the shaft 63 about the axis 62. Raising the push member 77 out of the housing 64 allows the tube 1 to pass into a position which is symmetrical with the position represented with respect to the axis yy' in FIG. 7c.

The spring 71 is intended to maintain pressure between the shaft 63 and the push member 77 and, on the other hand, to minimize the value of the clearances and counter the vibrations and to maintain permanent contact between the inclined plane 68 and the screw 73.

The section AA of FIG. 7b is intended to show the mechanical connection of the tube 1 and the shaft 63. The shaft 63 is transversely extended by pins 78, 79 rotating on bearings 80–81 of the body 60. The pin 79 is fitted and screwed into a part 7 of the tube 1.

Figure 8A:
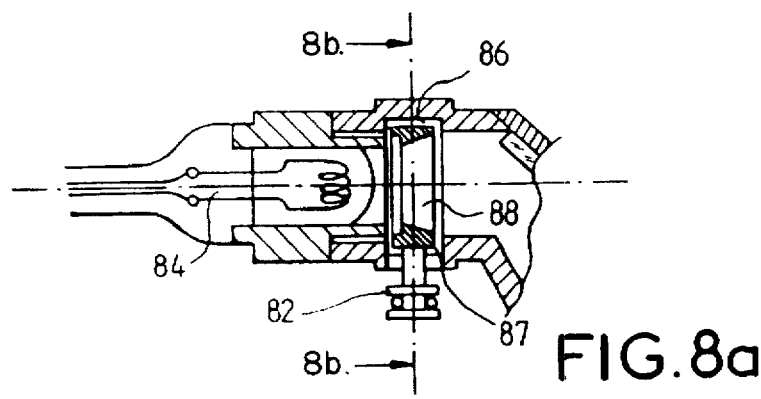
FIGS. 8a and 8b represent a detail of changing the mechanical sighting device when the image is generated using diodes and when changing from adjustment for one eye to adjustment at the other eye.
Figure 8B:
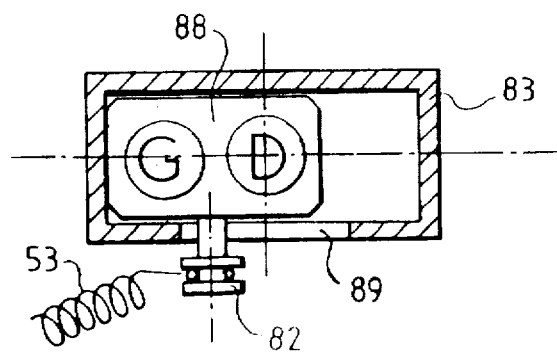

FIGS. 8a and b are intended to show a sighting-device change mechanism in the case of a helmet sight, the sighting device of which consists of a figure illuminated by light-emitting diodes. In this case, in view of the known aberrations of the optronic image transmission system employed, it may prove expedient to start with a slightly different image from that which it is desired to obtain at the finish. In such cases, the starting image for presentation to the right eye is in general different from the starting image for presentation to the left eye.

In this case, the spring 53 is fixed as represented in FIG. 7a, on the one hand to a stud 56 of the body 60 and, on the other hand, to a stud 82 sliding transversely to the axis DD' of the optronic assembly 10. This stud slides in a support 83 represented schematically in FIG. 7a and in two cross-sections forming the subject-matter of FIGS. 8a and 8b.

The section 8a is a cross-section along the, axis DD', and the section 8b is taken along the line 8b—8b in FIG. 8a.

Illumination means 84 and a support 83 of a sighting-device holder 88 which includes top and bottom grooves 86, 87 in which the sighting-device holder 88 carrying the right image on the right and carrying the left image on the left can slide have been represented. An oblong through-hole 89 made in the support 83 allows the sighting-device holder 88 to be moved between an extreme right position and an extreme left position.

Changing from the right position to the left position is done automatically when the tube 1 moves from left to right under the action of the spring 53 on the stud 82.

Figure 9:
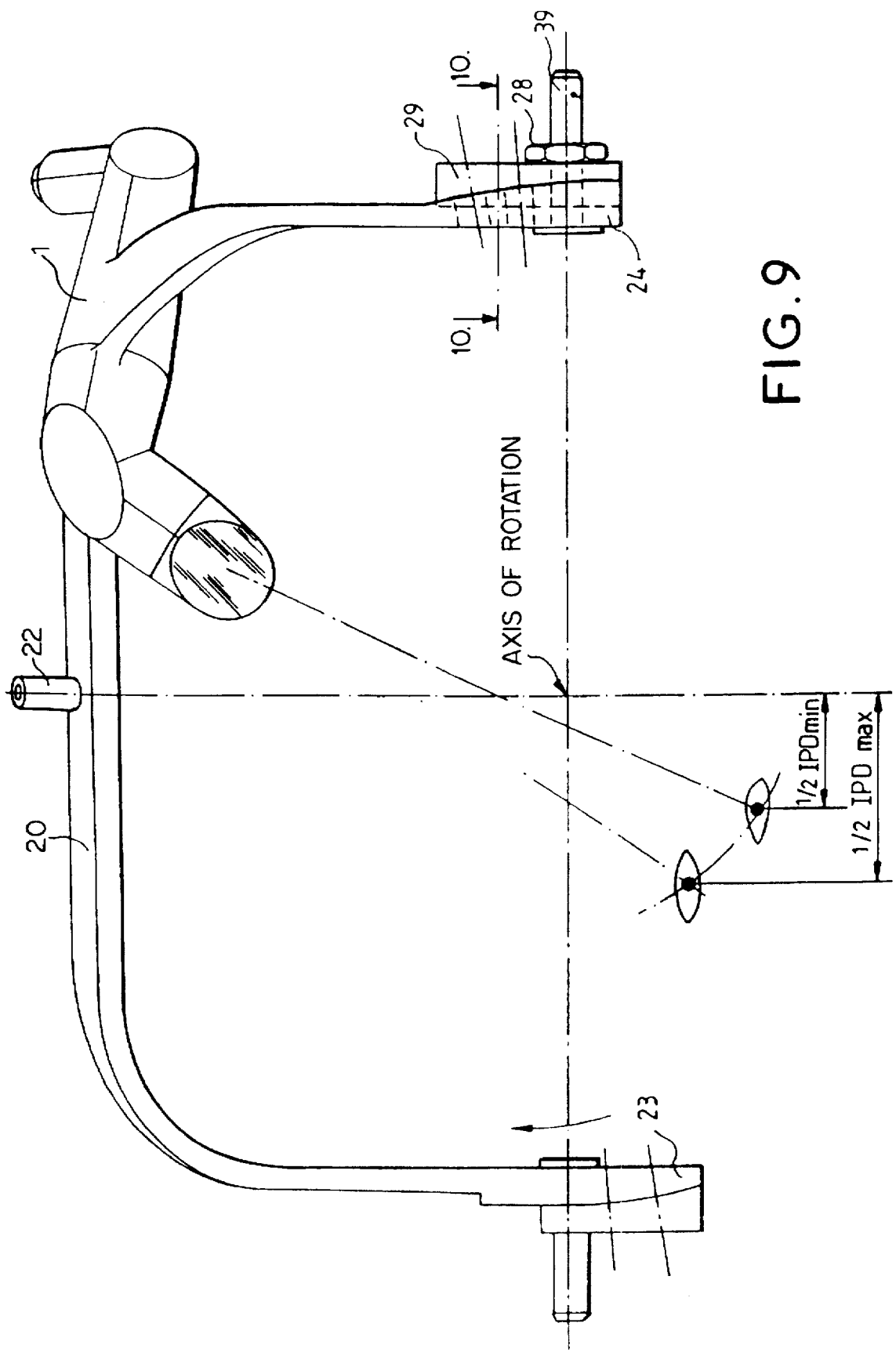
FIGS. 9 and 10 represent another embodiment of the device, the overall view of which is represented in FIG. 6.
Figure 10:
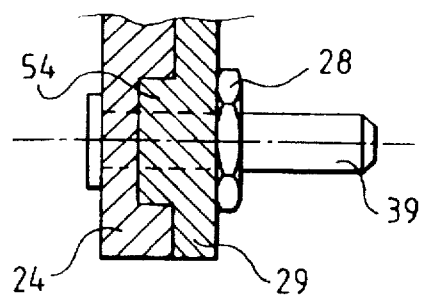

FIGS. 9 and 10 illustrate another embodiment of the invention, in which the tube 1 constituting a rigid substructure containing the optronics 10 is solidly attached to a rigid plate 20. This plate includes a stud 22, the axis of which is a vertical axis contained in the sagittal plane. The stud 22 is contained in the mounted position in an oblong housing of the shell 30, not shown, in which it can slide radially. The plate has substantially the shape of an arc having two ends 23, 24 of cylindrical outer shape, the axis of revolution of the cylinder part being the axis of revolution of the optical parts of the visor when it is in the bottom position. Each of the ends can slide along a plane perpendicular to the sagittal plane in a rail solidly attached to a pin 39 which is solidly attached to the shell 30 of the helmet. A threaded part of this pin 39 makes it possible to hold, solidly and immobilized in the adjusted rotation position, a part 29 solidly attached to the pin 39 and the end 24 of the plate. Fastening is obtained by clamping, using a nut 28, the end 24 and the part 29 as represented in section in a plane parallel to the sagittal plane in FIG. 10. This section also shows the interlocking of the end 24 and the part 29 in a plane perpendicular to the sagittal plane.

The rail consists of a boss 54 of the part 29 solidly attached to the shell of the helmet. The end 24 has a shape allowing sliding insertion in the boss 54 of the part 29.

Rotation is required only over a very small angle since it is sufficient to be capable of changing from a minimum IPD to a maximum IPD. The minimum and maximum IPD dimensions are known to the person skilled in the art.

Figure 11:
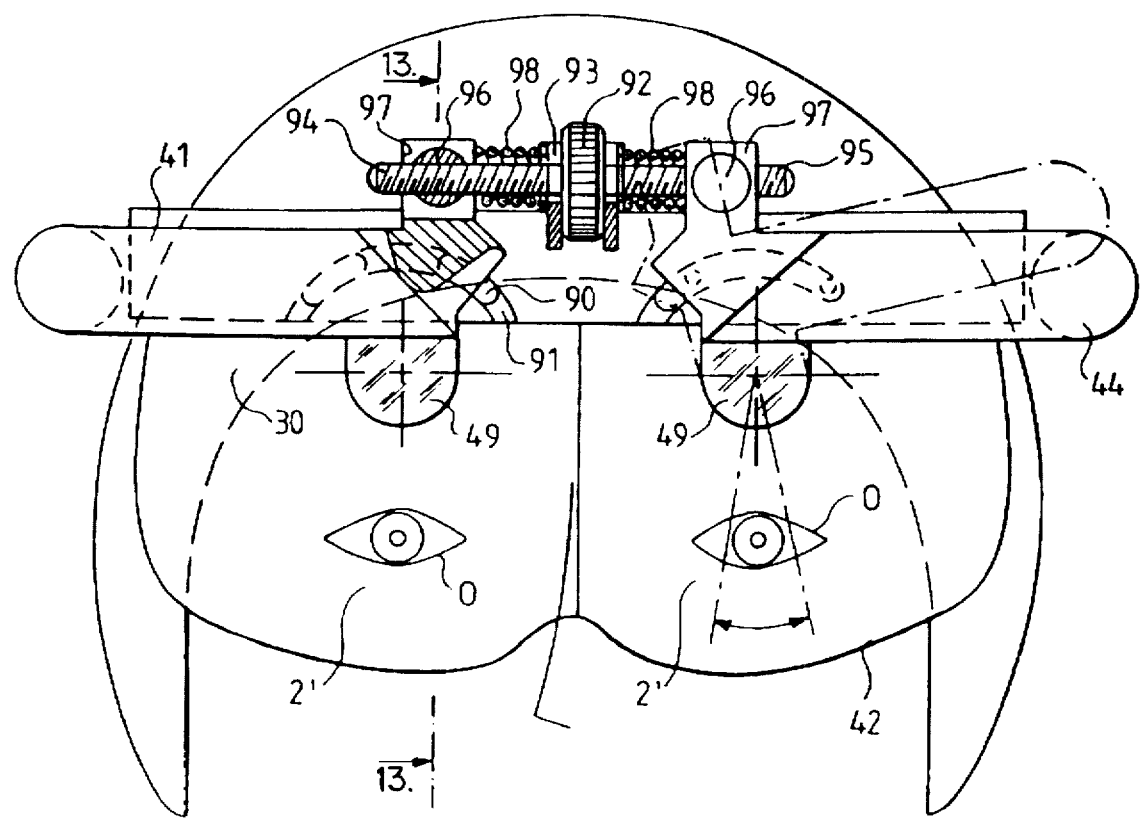
FIG. 11 is a front view of a helmet according to the invention, equipped with a binocular device with a self-supporting structure, each monocular unit being movable in rotation.
Figure 12:
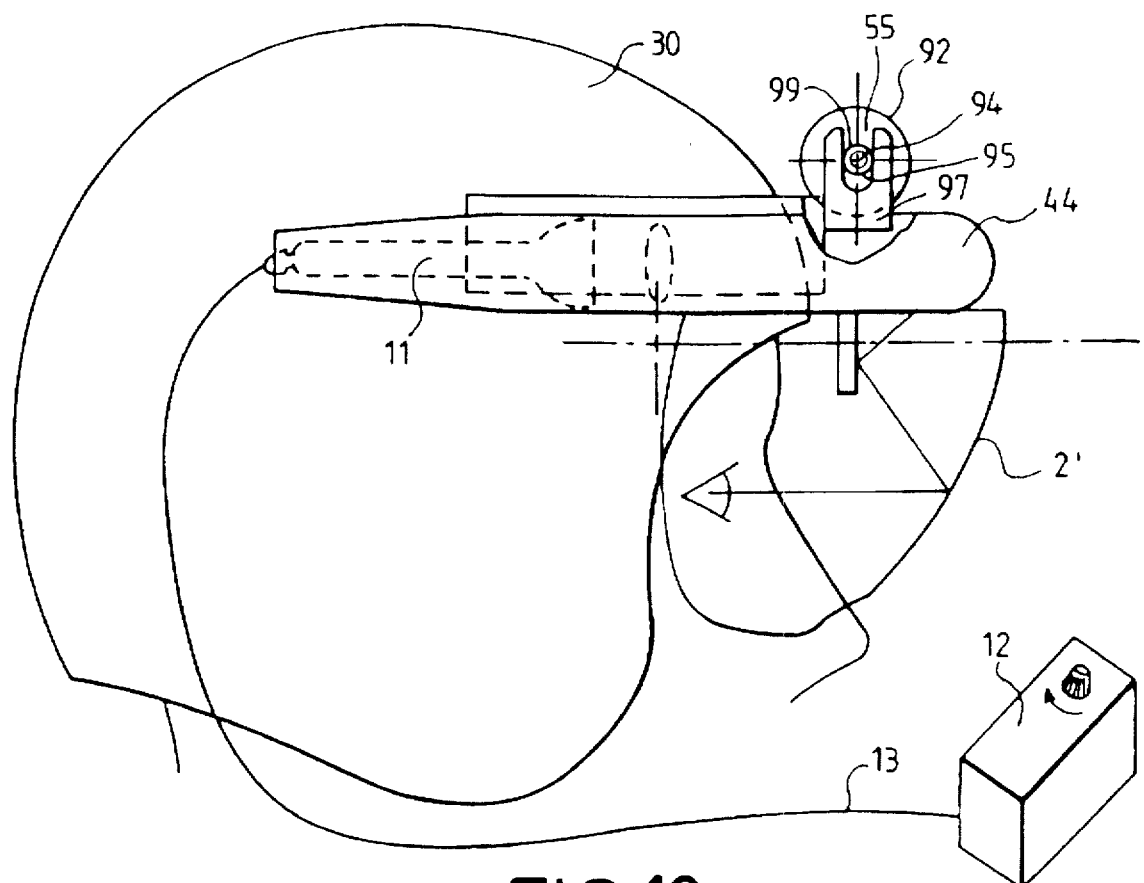
FIG. 12 represents a side view of the helmet according to FIG. 11.
Figure 13:
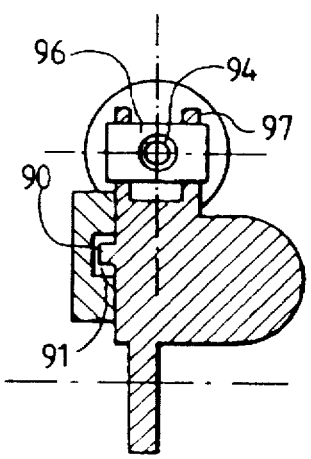
FIG. 13 represents a partial section of elements of FIG. 11.

FIGS. 11, 12 and 13 represent a variant embodiment of the self-supporting monoblock structure as described with reference to FIG. 5.

FIG. 11 is a front view of an assembly comprising the shell 30 of the helmet and the self-supporting structure 41.

A visor 42 includes two spherical optical zones 2' constituting return surfaces for each eye. In this embodiment, the two symmetrical L-shaped elements 44 are no longer connected in the front part by a rigid structure but by a mechanical structure allowing mechanical pivoting of each of the Ls forming the tubular structure. The axis of rotation of each of the L-shaped halves 44 is an axis of revolution of each of the return surfaces 2'.

The optronics contained in the L-shaped parts 44 is optically terminated by mirrors 49 constituting the optical connection between the optronics and the visor.

An example of the mechanism intended to produce such rotation symmetrically with respect to the sagittal plane will now be described.

The mechanism comprises a guide stud 90. This stud 90 is mounted so as to slide in a groove 91, the axial line of which is a parallel of a cylindrical surface mechanically connected to the shell 30 of the helmet. It is advantageous, for reasons of accurate positioning, for the stud 90 to have a shape extending longitudinally in the direction of the axial line of the cylindrical surface. The axis of revolution of the cylindrical surface into which the groove 91 is cut is an axis of revolution of the return surface 2'. A knurled screw 92 is captive in a fork 93 mechanically connected to the shell 30 of the helmet. The knurled screw 92 has its transverse plane substantially in the sagittal plane.

It is extended symmetrically with respect to this plane by two threaded rods 94, 95, one having a right-handed screw thread and the other having a left-handed screw thread. Each of the rods 94, 95 is engaged in a pivoting captive nut 96. The nut 96 is captive in a fork 97 mechanically connected to a structural element of the L-shaped optronic device 44. Two longitudinal springs 98 having as an axis the axis of each of the threaded rods 94, 95 bear at one end on the fork 93 for holding the knurled screw 92 and, at the other end, on the fork 97 for holding the nut 96 captive.

In order better to make understood the mechanical arrangement of the various components contributing to symmetrical rotation of the L-shaped substructure 44, the part connecting the substructure 44 to the fork 97 and to the nut 96 has been represented in section along the line AA of FIG. 11 in FIG. 13. This section also shows the shapes of the stud 90 and of the groove 91.

Operation is as follows.

Action on the knurled screw 92 causes the nuts 96 to move towards each other or away from each other. The right part of FIG. 11 shows, in dashes—bringing closer of the part 44, causing enlargement of the setting of the interpupillary distance of the optronic means.

Pivoting the nut about an axis parallel to the sagittal plane makes it possible to keep the rods 94, 95 horizontal. Each fork 97 is provided with an oblong slot 55 (FIG. 12) allowing movement of the rods 94, 95 in a vertical plane. Bringing the nut 96 closer causes the upper part of the structure 44 to be brought closer, which causes rotation of this structure, guided by the stud 90 in the groove 91.

The spring 98 has the function of taking up the plays necessary for the movement by exerting a bearing force. FIG. 12 furthermore represents a cathode-ray tube 11 for generating the symbols. The position of the symbolic image generated may be controlled by a control means 12 connected to the tube by a link 13.

The rotation device described hereinabove was used because, as a result of the small volume available between the eyes of the pilot and the visor, it was not possible to produce guidance in rotation directly by setting a shaft in a bore.

With the devices described hereinabove with reference to FIGS. 6 to 9, in order to adjust the optronics, the value of the IPD is first adjusted by rotational positioning of the rigid parts carrying the optronics, then the height thus adjusted is set with respect to the eye of the wearer. In the case of the structures described in conjunction with FIGS. 11 to 13, the interpupillary adjustment is carried out with the helmet worn.

We claim:

1. A protective helmet comprising:
   a shell;
   an optronic assembly generating a collimated image;
   a combiner including a reflecting surface which has at least one axis of revolution, the combiner returning the collimated image to a position of the eye level of a wearer of the helmet;
   a mechanism adjusting about the at least one axis of revolution of the combiner a position of the optronic assembly with respect to the combiner and locking the optronic assembly in said adjusted position wherein the optronic assembly rotates about the at least one axis of revolution of the surface of the combiner.

2. The protective helmet according to claim 1, wherein the optronic assembly is assembled on an autonomous rigid mechanical structure fixed to the shell.

3. The helmet according to claim 2, wherein the mechanical structure is self-supporting.

4. The helmet according to claim 2, wherein the mechanical structure includes a plate having substantially a shape of at least a part of the shell.

5. The helmet according to claim 2, wherein the autonomous rigid structure is constituted by a reinforcement of the shell.

6. The helmet according to claim 2, wherein the autonomous rigid structure carries a rigid substructure housing the optronic assembly.

7. The helmet according to claim 6, wherein the adjusting of the optronic assembly results from the rigid substructure and the rigid structure being movable in rotation with respect to one another.

8. The helmet according to claim 6, wherein the autonomous rigid structure is mounted on the shell by allowing the autonomous rigid structure to rotate with respect to the shell and including a mechanism allowing the autonomous rigid structure to be fixed in the adjusted position, the substructure being solidly attached to the autonomous rigid structure.

9. The helmet according to claim 7, further comprising a sighting-device holder moveable in a support, the sighting-device holder carrying a right image and a left image, and a mechanism allowing positioning of the right or left image suited to the adjusted position.

10. The helmet according to claim 3, wherein the self-supporting mechanical structure comprises substructures in a form of rigid tubes comprising two L-shaped branches which are mutually symmetrical with respect to a vertical plane.

11. The helmet according to claim 10, wherein the substructures house the optronic assembly.

12. The helmet according to claim 11, wherein the two L-shaped branches are equipped with a mechanism allowing their rotation about horizontal axes parallel to a sagittal plane of the helmet.

13. The helmet according to claim 12, wherein the mechanism rotating the two L-shaped branches includes a knurled screw captive in a fork mechanically connected to the shell, the knurled screw being extended symmetrically by threaded rods engaged in pivoting nuts captive in forks mechanically connected to a structural element of each L-shaped branch.

14. The helmet according to any one of claims 2, 4 or 6, wherein the mechanical structure is fixed by setting in a hard foam.

15. The helmet according to either one of claims 4 or 6, wherein the mechanical structure is mounted on the shell by fastening lugs mechanically connected to one of the plate and the shell.

16. The helmet according to claim 1, further comprising a protective visor forming an integral part with the combiner.

17. The helmet according to claim 1, wherein the mechanism adjusting the position of the optronic assembly comprises a shaft and a bearing which are pivotable with respect to each other, one of the shaft and bearing being fixed with respect to the shell and the other of the shaft and bearing being fixed with respect to the optronic assembly.

18. The helmet according to claim 16, wherein the mechanism adjusting the position of the optronic assembly includes a slot and a stud slidable in said slot, one of the slot and the stud being fixed with respect to the shell and the other of the slot and the stud being fixed with respect to the optronic assembly.

19. A protective helmet comprising:
   a shell;
   an optronic assembly generating a collimated image;
   a combiner including a reflecting surface which has at least one axis of revolution, the combiner returning the collimated image to a position of an eye of a wearer of the helmet;
   a mechanism adjusting a position of the optronic assembly with respect to the combiner and locking the optronic assembly in said adjusted position;
   wherein the optronic assembly is assembled on an autonomous rigid mechanical structure fixed to the shell, the autonomous rigid structure has a rigid substructure mounted thereon housing the optronic assembly and the mechanism adjusting of the optronic assembly includes a mechanism permitting the rigid substructure and the rigid structure to be rotatable with respect to one another; and
   wherein the rigid substructure includes a shaft, a cross-section of which has a shape of a circle on which a sector terminated by two inclined planes is attached, the shaft is movable in rotation in a housing of a body which is fixed with respect to the rigid substructure, and the shaft is locked by a push member and a screw bearing on each of the inclined planes.

20. A method for setting an image generated by a set of optronic assemblies of a helmet display in an adjusted position, the helmet comprising a shell and a rigid structure mounted on the shell, the structure including at least first and second parts, which can be moved with respect to one another, the image being projected onto a surface of an element reflecting at least a part of the light received, and having at least one axis of revolution, this element having a function, in an adjusted position, of returning the image to the pupil of an eye of an observer, which method comprises the steps of rotating one of the first or second parts of the rigid structure with respect to the other of the first or second parts about an axis of revolution of the reflecting element, and locking the rigid structure in the adjusted position.

* * * * *